UNITED STATES PATENT OFFICE.

JOHN A. HUNTER, OF PHILADELPHIA, PENNSYLVANIA.

PROCESS OF CONVERTING CAST-IRON INTO STEEL OR MALLEABLE IRON.

SPECIFICATION forming part of Letters Patent No. 600,948, dated March 22, 1898.

Application filed December 26, 1894. Renewed August 25, 1897. Serial No. 649,528. (No specimens.)

*To all whom it may concern:*

Be it known that I, JOHN A. HUNTER, a citizen of the United States, residing in Philadelphia, Pennsylvania, have invented certain Improvements in Converting Cast-Iron into Steel or Malleable Iron, of which the following is a specification.

My invention relates to that method of converting cast-iron into steel or malleable iron which consists in subjecting the iron while highly heated to the action of oxygen evolved by chemical action or reaction of materials contained in a crucible or retort or upon the hearth where the treatment is effected, the object of my invention being to effect the evolution of the oxygen without the formation of salts which have a tendency to combine with and destroy the lining of the furnace and in the case of the use of the crucible or retort without such ebullition as would cause them to leave the crucible and gain access to the lining of the furnace.

In carrying out my invention I employ sulfuric acid in connection with an oxid or salt, which when subjected to the action of the acid will be decomposed, so as to liberate oxygen and form with the sulfuric acid a sulfate of its original base.

The iron to be treated may be contained in a closed crucible, sagger, or retort into which the sulfuric acid and oxid or salt are also introduced, the vessel with its contents being then subjected to heat in an ordinary furnace, or the iron may be first heated and the chemical compound then introduced into the vessel containing the heated iron, or the iron may be heated upon the hearth of a closed or muffle furnace, and after the proper degree of heat has been reached the chemical compound contained in a suitable vessel may be introduced into the furnace, so as to provide for the necessary evolution of oxygen for action upon the heated iron. In no case, however, is the treating agent packed around the iron in the crucible, sagger, or retort, as in the ordinary cementation process, the aim, on the other hand, being to expose as much of the surface of each of the articles as possible to the action of the gas generated in or introduced into the vessel containing said articles.

My invention may be carried out by the use of sulfuric acid in connection with any of the oxids or salts which will be decomposed by the acid, so as to free oxygen and form a sulfate of the original base which will have no tendency to escape from the vessel in which it is contained, and even if it does escape therefrom will have no injurious effect upon the fire-brick lining of the furnace. I may, for instance, use oxid of manganese, hypochlorite of lime, chlorate or nitrate of potash, or many other compounds having a metallic or earthy base.

Having thus described my invention, I claim and desire to secure by Letters Patent—

The mode herein described of converting cast-iron into steel or malleable iron, said mode consisting in heating the iron and, without packing the iron, introducing into the furnace or vessel in which said iron is heated a mixture of sulfuric acid and an agent, which will be decomposed by said acid so as to free oxygen and form a sulfate of its original base, substantially as specified.

In testimony whereof I have signed my name to this specification in the presence of two subscribing witnesses.

JNO. A. HUNTER.

Witnesses:
   WILL. A. BARR,
   JOSEPH H. KLEIN.